O. P. VROOM.
CORN HARVESTING MACHINE.
APPLICATION FILED DEC. 28, 1911.

1,073,572.

Patented Sept. 16, 1913.

Witnesses

Oter P. Vroom,
Inventor by C. A. Snow & Co.
Attorneys

UNITED STATES PATENT OFFICE.

OLER P. VROOM, OF LINNEUS, MISSOURI, ASSIGNOR TO THE SUPERIOR HAY STACKER MFG. CO., OF LINNEUS, MISSOURI.

CORN-HARVESTING MACHINE.

1,073,572.        Specification of Letters Patent.      Patented Sept. 16, 1913.

Application filed December 28, 1911. Serial No. 668,288.

*To all whom it may concern:*

Be it known that I, OLER P. VROOM, a citizen of the United States, residing at Linneus, in the county of Linn and State of Missouri, have invented a new and useful Corn-Harvesting Machine, of which the following is a specification.

The present invention relates to improvements in corn harvesting machines, the primary object of the invention being the provision of an improved form of stalk guard or gate and especially an improvement upon the structure shown in applicant's application filed June 14, 1911, Serial No. 633,101, the present gate being spring closed so that the stalks, as they are fed toward the rear platform, are properly held and when a sufficient number are gathered and held in an upright position to produce the desired shock, the said guard or gate will be automatically moved to shock releasing position or may be moved manually to be automatically returned to shock retaining position after the removal of the shock.

A further object of the present invention is the provision of a means whereby the stalks when engaged by the guides carried by this form of machine are pushed toward the cutting edge so that the same engage the cutting edge at its farthest forward point so that by the time the stalk is moved along the blade, the same is severed at an earlier stage than if such device were not employed.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
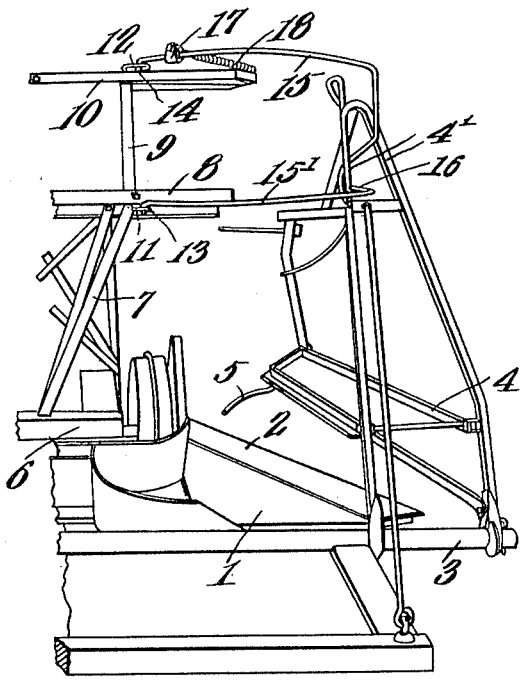
Figure 2:
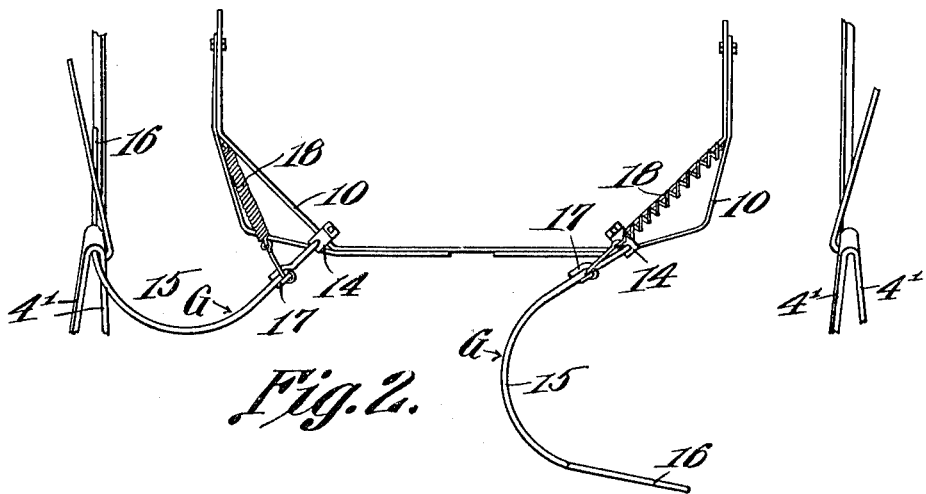

In the drawings Figure 1 is a fragmentary perspective taken from the rear of one side of a corn harvesting machine embodying the present invention. Fig. 2 is a top plan view of the spring actuated gate or guard as shown upon a harvester employing two cutting and feeding mechanisms, one of the said guards being shown in open position when the shock is being removed.

Referring to the drawings, the numeral 1 designates the platform of the machine which is provided with the cutting or stationary blade 2 and with the guard carrying transversely disposed shaft 3, said guard being pivotally connected and movable with said shaft 3 and although only one of these is shown, there are two used where the harvesting machine is employed for harvesting two rows of corn as in the aforementioned application. The guard 4 is provided with the spring terminal arms 5 projecting inwardly toward the cutting edge of the blade 2, so that when the standing crop or stalk is engaged thereby, the stalks will be deflected toward the forward edge of the cutting blade 2, so that the cutting blade 2 as the same is moved along will engage the stalk at an earlier period, or farther forward point, than would be the case were not the spring arm 5 employed. By this means the stalk is cut at an earlier stage and guided upon the platform 1 to be retained there until a sufficient number have been gathered to form the shock.

Connected to the machine is a transverse bar 6 which properly supports the braces 7 carrying the respective angular members 8 and 10 of the framework, said members 8 and 10 being spaced and held in proper relation by means of the vertical rods 9. The lugs 11 and 12 provide pivoting means for the respective hooked ends 13 and 14 of the pivotally mounted shock receiving guard or gate G, whose terminals or spaced arms 15 and 15' terminate in the reduced terminal 16, which when the guard or gate is in shock receiving position passes between the portions 4' of the upper end of the guard 4 and are thus held against outward movement but permitted a swinging movement from the position as shown at the left Fig. 2 to that shown at the right in Fig. 2.

In order to automatically return the gate from the position as shown at the right in Fig. 2 to that shown at the left in Fig. 2, an adjustable connecting plate 17 is mounted upon the upper arm 15 of the guard or gate G and a spring 18 is employed which is connected to the member 10 at the forward portion thereof and exerts a tension to normally hold the terminal 16 seated between the portions 4' of the guard 4.

From the foregoing description taken in connection with the drawings, it is evident that as the stalks are cut and placed upon the platform 1 in an upright position with the top ends resting against the arms 15 and 15' of the guard or gate G and that as the number increases to form the shock, the said arms will have a tendency to move rearwardly from the position as shown at the left to that shown at the right in Fig. 2 so that the shock may be readily removed when formed. When the shock is removed, the spring 18 will automatically return the gate to shock receiving position, the portions 4' holding the terminal 16 of the respective guards or gates against outward movement but at the same time permitting the withdrawal or insertion thereof during the movement from shock removing to shock forming or retaining position. It is also evident that the said gates may be moved manually to shock releasing position by an operator standing upon the rear of the platform of the machine.

What is claimed is:

1. A corn harvesting machine, having a platform to receive the stubs or butt ends of the stalks, a frame carried by said platform, a guard carried by the platform in spaced relation to the frame, a pivoted spring closed gate connected to the frame and in operable relation to the guard so as to form a resilient rest for the upper ends of the stalk during the shock forming operation, said gate comprising a member having two spaced terminals and a reduced bridging portion forming the free end, said terminals being curved to surround the stalks as they are formed into a shock, the other terminals of the arms being pivotally connected to the frame, and a spring connected to the frame and to the upper arm for normally holding the free terminal of the arm in engagement with the guard and in shock forming position.

2. A corn harvesting machine, having a platform, a stalk guide disposed at one side thereof, a frame carried intermediate of the platform and in spaced relation to the stalk guide, a pair of spaced arms pivotally connected to the frame and provided with a reduced free terminal, said terminal being disposed to engage the stalk guide at the upper end thereof and form a gate to receive the stalks as they are cut and placed upon the platform, and a spring connected to the frame and to said arms for normally holding the arms in shock forming position.

3. A corn harvesting machine, having a platform, a frame having two spaced members, at the upper portion thereof and carried by the platform, a stalk guide carried by the platform with the upper end thereof in spaced relation to the spaced members of the frame, a pair of pivoting lugs carried by the spaced members of the frame, and a spring closed top engaging gate pivotally mounted in the lugs and disposed to have the free end thereof engage the upper end of the guide to span the space between the frame and guide.

4. A corn harvesting machine, having a platform, a frame having two spaced members, at the upper portion thereof and carried by the platform, a stalk guide carried by the platform with the upper end thereof in spaced relation to the spaced members of the frame, a pair of pivoting lugs carried by the spaced members of the frame, a closure made from a single piece of wire bent to form two spaced curved terminals having hooked ends engaged in the lugs of the spaced members of the frame with a reduced end normally engaging the guide at the upper end thereof, and a spring having one end adjustably connected to the upper arm of the closure, the forward end thereof being connected to the frame to hold the closure in shock forming position.

In testimony that I claim the foregoing as my own, I have hereto affixed my signature in the presence of two witnesses.

OLER P. VROOM.

Witnesses:
M. B. FETTY,
W. P. THORNE.